United States Patent
Shi

(10) Patent No.: US 8,995,042 B2
(45) Date of Patent: Mar. 31, 2015

(54) ELECTROCHROMIC THIN FILM, ELECTROCHROMIC DEVICE, AND MANUFACTURING METHOD THEREOF

(71) Applicant: Boe Technology Group Co., Ltd., Beijing (CN)

(72) Inventor: Yue Shi, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 43 days.

(21) Appl. No.: 14/011,970

(22) Filed: Aug. 28, 2013

(65) Prior Publication Data
US 2014/0063584 A1    Mar. 6, 2014

(30) Foreign Application Priority Data
Sep. 3, 2012  (CN) .......................... 2012 1 0322667

(51) Int. Cl.
*G02F 1/153* (2006.01)
*G02F 1/15* (2006.01)

(52) U.S. Cl.
CPC .............. *G02F 1/153* (2013.01); *G02F 1/1506* (2013.01); *G02F 1/1523* (2013.01)
USPC .......................................... 359/265; 427/162

(58) Field of Classification Search
CPC ...... G02F 1/153; G02F 1/1506; G02B 1/1523
USPC .......................................... 359/265; 427/162
See application file for complete search history.

(56) References Cited

U.S. PATENT DOCUMENTS

| | | | | |
|---|---|---|---|---|
| 7,830,584 | B2 * | 11/2010 | Shibuya et al. | 359/265 |
| 8,035,882 | B2 * | 10/2011 | Fanton et al. | 359/265 |
| 2012/0038966 | A1 * | 2/2012 | Yeh et al. | 359/268 |

FOREIGN PATENT DOCUMENTS

| | | |
|---|---|---|
| CN | 1492274 A | 4/2004 |
| CN | 102455560 A2 | 5/2012 |

OTHER PUBLICATIONS

First Chinese Office Action dated Jul. 21, 2014; Appln. No. 201210322667.4.

* cited by examiner

*Primary Examiner* — David N Spector
(74) *Attorney, Agent, or Firm* — Ladas & Parry LLP

(57) ABSTRACT

An electrochromic thin film, an electrochromic device, and a manufacturing method thereof are disclosed. The electrochromic device comprises: a first substrate and a second substrate provided opposite to each other, a first transparent electrically-conductive layer provided on the inner side of the first substrate, a second transparent electrically-conductive layer provided on the inner side of the second substrate, an organic-inorganic electrochromic thin film provided between the first transparent electrically-conductive layer and the second transparent electrically-conductive layer. The organic-inorganic electrochromic thin film is obtained by forming a mesh-like microsphere-film on the first transparent electrically-conductive layer; forming an inorganic electrochromic film in the voids of the microsphere-film and removing the microsphere-film; and making the inorganic electrochromic film and an organic electrochromic solution undergo a polymerization reaction.

15 Claims, 2 Drawing Sheets ional electrochromic materials and organic electrochromic materials. Inorganic electrochromic materials have advantages such as high cycling stability, strong adhesion and high thermal stability, as well as long service-life, etc.; organic electrochromic materials have advantages such as fast response, rich color-changes, good processability, ease of designing molecules, and low costs. A single inorganic or organic electrochromic material has its disadvantages, and therefore organic-inorganic composite electrochromic materials have been gaining more and more attention.

ELECTROCHROMIC THIN FILM, ELECTROCHROMIC DEVICE, AND MANUFACTURING METHOD THEREOF

TECHNICAL FIELD

Embodiments of the present disclosure relate to an electrochromic thin film, an electrochromic device, and a manufacturing method thereof.

BACKGROUND

Under the action of an external electric field, an electrochromic material undergoes an oxidation-reduction reaction and at the same time causes a reversible change in light transmission or reflection, which appears as a reversible coloring phenomenon. Electrochromic materials can be divided into inorganic electrochromic materials and organic electrochromic materials. Inorganic electrochromic materials have advantages such as high cycling stability, strong adhesion and high thermal stability, as well as long service-life, etc.; organic electrochromic materials have advantages such as fast response, rich color-changes, good processability, ease of designing molecules, and low costs. A single inorganic or organic electrochromic material has its disadvantages, and therefore organic-inorganic composite electrochromic materials have been gaining more and more attention.

At present, it is also a focus of research to produce an electrochromic material with better performances, by choosing appropriate types of organic and inorganic materials and utilizing synergy effects between the structures and performances of these materials. Conventional organic-inorganic composite electrochromic thin films have the problems as follows. As an electrochromic device is increased in size, for example, when such device is applied in a floor-to-ceiling window, a car-window, or other large-sized applications, the uniformity of the display will become much degraded, that is, there are substantial difference in transmittance among various regions (such as upper, lower, left, right, center portions) of the display device during color-displaying, and this greatly influences the display effect of the electrochromic device.

SUMMARY

Embodiments of the present disclosure provide an electrochromic thin film, an electrochromic device, and a manufacturing method thereof, which can be used to produce an electrochromic device with slight difference in transmittance among various regions, and contribute to the good display effect of the electrochromic device.

One aspect of the present disclosure provides an electrochromic device, which comprises: providing a first substrate and a second substrate opposite to each other, providing a first transparent electrically-conductive layer on the inner side of the first substrate, providing a second transparent electrically-conductive layer on the inner side of the second substrate, and providing an organic-inorganic electrochromic thin film between the first transparent electrically-conductive layer and the second transparent electrically-conductive layer. The organic-inorganic electrochromic thin film is obtained by: forming a mesh-like microsphere-film on the first transparent electrically-conductive layer; forming an inorganic electrochromic film in voids of the microsphere-film and then removing the microsphere-film; and making the inorganic electrochromic film and an organic electrochromic solution undergo a polymerization reaction.

Another aspect of the present disclosure provides a method of manufacturing an electrochromic thin film, and the method comprises: forming a mesh-like microsphere-film on a substrate; forming an inorganic electrochromic film in voids of the microsphere-film; removing the microsphere-film with a solvent; and making the inorganic electrochromic film and an organic electrochromic solution undergo a polymerization reaction to produce an organic-inorganic electrochromic thin film on the substrate.

Yet another aspect of the present disclosure provides a method of manufacturing an electrochromic device, and the method comprises: providing a first substrate, providing a first transparent electrically-conductive layer on the first substrate, providing a second substrate opposite to the first substrate, providing a second transparent electrically-conductive layer on the inner side of the second substrate, between the first transparent electrically-conductive layer and the second transparent electrically-conductive layer, forming an organic-inorganic electrochromic thin film by using the aforementioned manufacturing method.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

DETAILED DESCRIPTION

Below, in connection with the accompanying drawings of the embodiments of the present disclosure, the technical solutions in the embodiments of the present disclosure will be described in a clearly and fully understandable way. It is obvious that, the described embodiments are only a part but not all of the embodiments of the present disclosure. Based on the embodiments of the present disclosure, those skilled in the art can obtain other embodiment(s), which should all be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," "the" and so on are not intended to limit the amount, but indicate the existence of at lease one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
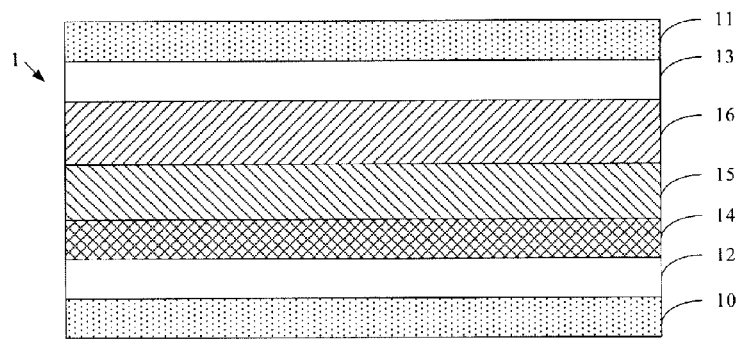
FIG. 1 is a schematic structural diagram of an electrochromic device of the present disclosure.

An embodiment of the present disclosure provides an electrochromic device 1, as illustrated in FIG. 1, comprising: a first substrate 10 and a second substrate 11 provided opposite to each other, a first transparent electrically-conductive layer 12 provided on the inner side of the first substrate 10, a second transparent electrically-conductive layer 13 provided on the inner side of the second substrate 11, and an organic-inorganic electrochromic thin film 14 provided between the first transparent electrically-conductive layer 12 and the second transparent electrically-conductive layer 13. The organic-inorganic electrochromic thin film 14 is formed by a way as follows: forming a mesh-like microsphere-film on the first transparent electrically-conductive layer 12; after an inorganic electrochromic film is formed in the voids (spaces) of the microsphere-film, removing the microsphere-film and then making the inorganic electrochromic film and an organic electrochromic solution undergo a polymerization reaction.

Further, as illustrated in FIG. 1, the electrochromic device 1 may further comprises: an electrolyte layer 15 provided between the organic-inorganic electrochromic thin film 14 and the second transparent electrically-conductive layer 13. The electrolyte layer 15 may be formed of an appropriate electrically-conductive material, such as electrolyte materials in form of a solution or a solid including lithium perchlorate, sodium perchlorate, etc. Thus, when the electrochromic device 1 works, a proper voltage is applied between the first transparent electrically-conductive layer 12 and the second transparent electrically-conductive layer 13; under the action of the voltage, the organic-inorganic electrochromic thin film 14 will undergo an oxidation-reduction reaction; correspondingly, the electrolyte layer 15 provides compensation ions such as hydrogen-ions, lithium-ions, potassium-ions, sodium-ions, etc. as required for the oxidation-reduction reaction that the organic-inorganic electrochromic thin film 14 undergoes.

Further, as illustrated in FIG. 1, the electrochromic device 1 may further comprises: an ion-storage layer 16 provided between the electrolyte layer 15 and the second transparent electrically-conductive layer 13. When the electrochromic device 1 works, a proper voltage is applied between the first transparent electrically-conductive layer 12 and the second transparent electrically-conductive layer 13; under the action of the voltage, the organic-inorganic electrochromic thin film 14 will undergo an oxidation-reduction reaction, and its color will also change accordingly; correspondingly, the ion-storage layer 16 stores the corresponding compensation ions while the organic-inorganic electrochromic thin film 14 undergoes the oxidation-reduction reaction, and thus plays a role of maintaining charge balance for the whole system.

Below, the organic-inorganic electrochromic thin film 14 will be described. "Electrochromism" refers to such a phenomenon in which a material's optical properties (reflectance, transmittance, absorbance and so on) give rise to color change in a reversible and persistent way under the action of an external electric field, and the material presents some reversible and visible change in color and transparency. A material exhibiting an electrochromic property is called an electrochromic material; electrochromic materials can be classified into inorganic electrochromic materials and organic electrochromic materials. The organic-inorganic electrochromic thin film 14 in the embodiment of the present disclosure may be formed by allowing an inorganic electrochromic film made of an inorganic chromic material and an organic electrochromic solution to undergo a polymerization reaction. Organic electrochromic materials mainly include a part of polymer materials with electrically-conductivity.

A device made from an electrochromic material is called an electrochromic device; currently, various electrochromic devices have been widely applied in: anti-dazzle rearview mirrors in automobiles, display devices, smart windows, etc.

Electrochromic materials have bistable states. In this way, an electrochromic display device made from an electrochromic material does not need a backlight; moreover, after a static image is displayed, there is no power consumption as long as the display content is unchanged, and therefore the purpose of saving energy can be achieved. Compared with other displays, electrochromic displays further have advantages such as high contrast and no blind corners, etc.

In the embodiment of the present disclosure, since the organic-inorganic electrochromic thin film in the electrochromic device is formed by a way as follows: forming a mesh-like microsphere-film on the first transparent electrically-conductive layer, after an inorganic electrochromic film is formed in the voids of the microsphere-film, removing the microsphere-film and then making the inorganic electrochromic film and an organic electrochromic solution undergo a polymerization reaction, this makes the organic and inorganic chromic materials that are employed mixed uniformly. As result, even if the such-formed electrochromic device is increased in size (for example, a floor-to-ceiling window, a car-window, or other application using a large-sized window), it still has slight difference in transmittance among various display regions thereof, and also its display effect is good as well.

In accordance with the embodiment of the present disclosure, one example of the method of manufacturing an electrochromic thin film comprises the following steps.

S101, a substrate is provided.

S102, a mesh-like microsphere-film is formed on the substrate.

For example, the material of the microspheres in the microsphere-film is polymethylmethacrylate (PMMA).

In an example, a method of producing a microsphere-emulsion used for forming the microsphere-film comprises the following processes. In a mixed solvent of anhydrous ethanol and deionized water, a stabilizer is added and stirred until it is fully dissolved, and the stabilizer may be polyvinylpyrrolidone (PVP); in the mixed solvent, an initiator and methylmethacrylate are added, and the initiator may be benzoyl peroxide (BPO), azobisisobutyronitrile (AIBN) or potassium persulfate (KPS); under the protection of a protective gas such as nitrogen gas, the mixed solvent is pre-dispersed for 30 minutes and then its temperature is raised to 60° C., and after 24-hour reaction, the microsphere-emulsion is obtained.

In an example, forming of a mesh-like microsphere-film on the substrate may be conducted as follows. The microsphere-emulsion is coated on the substrate, by using a spin-coating method, for example, and then it is placed and dried, for example, in a drying oven at a temperature of 50° C., to form the mesh-like microsphere-film on the substrate.

S103, an inorganic electrochromic film is formed in the voids of the microsphere-film.

For example, the material of the inorganic electrochromic film is tungsten trioxide.

In an example, a method of producing a tungsten trioxide sol used for forming the inorganic electrochromic film comprises the following processes. Sodium tungstate is added into deionized water to produce a sodium tungstate solution at a concentration of $4.2 \times 10^{-3}$ mol/L; in the sodium tungstate solution, concentrated hydrochloric acid is dropwise added until no white floc is remained; in the sodium tungstate solution, concentrated sulfuric acid is dropwise added to adjust the pH value of the sodium tungstate solution to be within the range of 1-3; in the sodium tungstate solution, anhydrous ethanol, acetone, acetylacetone are sequentially dropwise added; the sodium tungstate solution is stirred for 4 hours to form tungsten trioxide sol. For example, the production of the tungsten trioxide sol is conducted under the conditions of no light and a temperature of 20° C.-30° C. Here, sodium tungstate can be replaced with other kind of water-solubility tungstate, such as potassium tungstate.

As an example, forming of an inorganic electrochromic film in the voids of the microsphere-film may be conducted as follows. In vacuum, the microsphere-film is dipped into the tungsten trioxide sol, and subjected to a heat treatment in a drying-oven at a temperature of 90° C. for 5 hours, to form the inorganic electrochromic film in the voids of the microsphere-film.

S104, the microsphere-film is removed with a solvent.

In an example, removing of the microsphere-film with a solvent may be conducted as follows. The microsphere-film is dissolved with an acetone solvent or a carbon tetrachloride solvent.

S105, the inorganic electrochromic film and an organic electrochromic solution are allowed to undergo a polymerization reaction to produce an organic-inorganic electrochromic thin film on the substrate.

In an example, the inorganic electrochromic film is immersed in a silane coupling agent solution for at least 10 minutes and then dried; at the room temperature, the inorganic electrochromic film is dipped into a pyrrole-solution for 5 minutes and then drawn out, and the pyrrole solution is obtained by mixing pyrrole and anhydrous ethanol, and the percentage by mass of pyrrole is 40%; the inorganic electrochromic film is dipped into a ferric trichloride solution to undergo a polymerization reaction for 20 minutes and then drawn out, and thereafter cleaned with deionized water and anhydrous ethanol to produce the organic-inorganic electrochromic thin film. For example, the ferric trichloride solution is formed by mixing ferric trichloride and deionized water, adding a suitable dopant, and then adding concentrated hydrochloric acid for hydrolyzation, and the percentage by mass of ferric trichloride is 30%. For example, the dopant may be p-toluene sulfonic acid.

The method of manufacturing an electrochromic thin film, in accordance with this embodiment of the present disclosure, comprises: providing a substrate; forming a mesh-like microsphere-film on the substrate; forming an inorganic electrochromic film in voids of the microsphere-film; removing the microsphere-film with a solvent; making the inorganic electrochromic film and an organic electrochromic solution undergo a polymerization reaction to produce an organic-inorganic electrochromic thin film on the substrate. In this way, since the organic-inorganic electrochromic thin film is formed by a way as follows: forming a mesh-like microsphere-film on a substrate, and after an inorganic electrochromic film is formed in the voids of the microsphere-film, removing the microsphere-film, and then making the inorganic electrochromic film and an organic electrochromic solution undergo a polymerization reaction, this makes the organic and inorganic chromic materials that are employed mixed uniformly. As result, even if the such-formed electrochromic device is increased in size (for example, a floor-to-ceiling window, a car-window, or other large-sized applications), the device still has slight difference in transmittance among various display regions thereof, and also its display effect is good as well.

An embodiment of the present disclosure further provides a method of manufacturing an electrochromic device, and the method comprises: providing a first substrate; forming a first transparent electrically-conductive layer on the first substrate; providing a second substrate opposite to the first substrate; forming a second transparent electrically-conductive layer on the inner side of the second substrate; between the first transparent electrically-conductive layer and the second transparent electrically-conductive layer, providing an organic-inorganic electrochromic thin film that is formed by the above-described method of manufacturing an electrochromic thin film.

In an example, the method of manufacturing the electrochromic device 1 comprises the following steps:

S201, a first substrate is provided.

For example, the material of the first substrate may be glass or a transparent substrate material.

S202, a first transparent electrically-conductive layer is formed on the first substrate.

Figure 2:
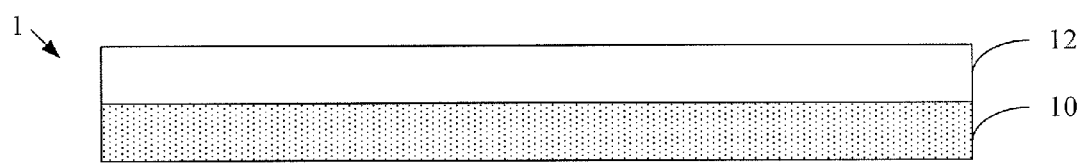
FIGS. 2-5 are first to fourth schematic structural diagrams of an electrochromic device during the procedure of a method of manufacturing an electrochromic device according to the present disclosure.

As illustrated in FIG. 2, a first transparent electrically-conductive layer 12 is formed on the first substrate 10. The first transparent electrically-conductive layer 12 may be a nano-structured indium tin oxide (ITO) glass with good electrical-conductivity and transparency.

S203, a mesh-like microsphere-film is formed on the first transparent electrically-conductive layer.

Figure 3:
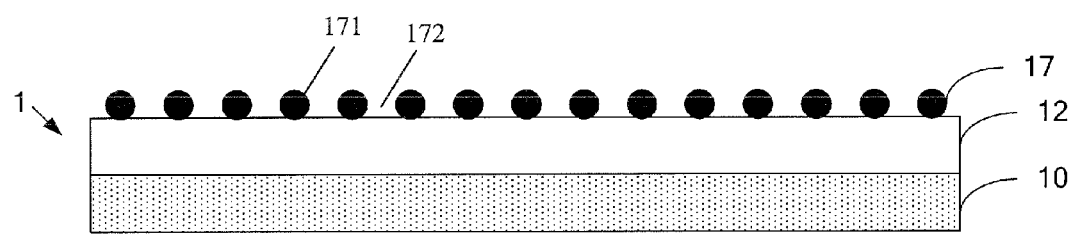

As illustrated in FIG. 3, a mesh-like microsphere-film 17 is formed on the first transparent electrically-conductive layer 12, and the material of the microspheres in the microsphere-film 17 is polymethylmethacrylate (PMMA). The microsphere-film 17 comprises a plurality of microspheres (beads) spread on the first transparent electrically-conductive layer 12 as a substrate with voids (spaces) 172 among the microspheres 171.

A method of producing a microsphere-emulsion used for forming the microsphere-film is for example conducted as follows. The employed raw materials include: methylmethacrylate (MMA), azobisisobutyronitrile (AIBN), benzoyl peroxide (BPO), potassium persulfate (KPS), polyvinylpyrrolidone (PVP), anhydrous-ethanol, and deionized water. The producing method may comprise the following processes. In a mixed solvent of anhydrous ethanol and deionized water, a stabilizer is added and stirred until it is fully dissolved, and the stabilizer may be polyvinylpyrrolidone (PVP); in the mixed solvent, an initiator and methylmethacrylate are added, and the initiator may be benzoyl peroxide (BPO) or azobisisobutyronitrile (AIBN) or potassium persulfate (KPS); under the protection of nitrogen gas, the mixed solvent is pre-dispersed for 30 minutes and then its temperature is raised to 60° C., and after 24-hour reaction, the microsphere-emulsion is formed.

The following table 1 exemplarily provides the amount of raw materials required for preparing 7-9 grams of polymethylmethacrylate-microspheres.

TABLE 1

| Component | BPO | PVP | MMA | Ethanol | Water |
|---|---|---|---|---|---|
| Grams (g) | 0.05-0.2 | 0.5-2.0 | 10 | 60-100 | 5-40 |

Below, a method of forming the mesh-like microsphere-film 17 on the first transparent electrically-conductive layer 12 will be introduced. As an example, the method comprises the following processes. The microsphere-emulsion is coated on the first transparent electrically-conductive layer 12, by using a spin-coating method, and then it is placed and dried, for example, in a drying oven at a temperature of 50° C., to form the mesh-like microsphere-film 17 on the first transparent electrically-conductive layer 12.

S204, an inorganic electrochromic film is formed in the voids of the microsphere-film.

Figure 4:
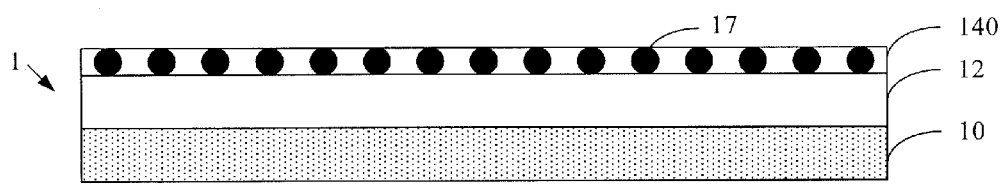

As illustrated in FIG. 4, since the microspheres in the microsphere-film 17 makes the microsphere-film 17 appear as a mesh with voids therein, an inorganic electrochromic film 140 can be formed in the voids of the microsphere-film 17. The material of the inorganic electrochromic film 140 is tungsten trioxide.

At first, a method of producing a tungsten trioxide sol used for forming the inorganic electrochromic film 140 will be introduced. As an example, the method comprises the following processes. A certain amount of sodium tungstate ($Na_2WO_4 \cdot 2H_2O$) is weighed and taken out, and while stirred by a magnetic stirrer for example, the sodium tungstate is added into deionized water to produce a sodium tungstate solution with a concentration of $4.2 \times 10^{-3}$ mol/L; in the sodium tungstate solution, concentrated hydrochloric acid is dropwise added until no white floc is remained, and the component of the white floc is tungsten trioxide; in the sodium tungstate solution, concentrated sulfuric acid is dropwise added to adjust the pH value of the sodium tungstate solution to be within the range of 1-3; in the sodium tungstate solution, anhydrous ethanol, acetone, acetylacetone are sequentially dropwise added; the sodium tungstate solution is stirred for 4 hours, to form the tungsten trioxide sol. For example, the production of the tungsten trioxide sol is conducted under the conditions of no light and a temperature of 20° C.-30° C.

Below, a method of forming an inorganic electrochromic film in the voids of the microsphere-film will be introduced. As an example, the method comprises the following processes. In vacuum, the microsphere-film is dipped into the tungsten trioxide sol and subjected to a heat treatment, for example, in a drying-oven at a temperature of 90° C. for 5 hours, to form the inorganic electrochromic film in the voids of the microsphere-film.

S205, the microsphere-film is removed with a solvent.

After the inorganic electrochromic film is formed in the voids of the microsphere-film, the microsphere-film is removed with a solvent. As an example, in the embodiment of the present disclosure, the microsphere-film may be dissolved with an acetone solvent or a carbon tetrachloride solvent.

S206, the inorganic electrochromic film and an organic electrochromic solution are allowed to undergo a polymerization reaction, to produce an organic-inorganic electrochromic thin film.

Figure 5:
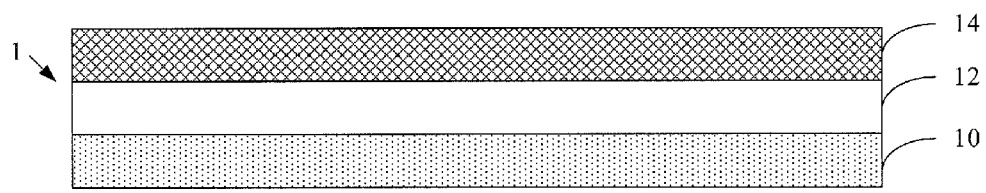

As illustrated in FIG. 5, an organic-inorganic electrochromic thin film 14 is formed on the first transparent electrically-conductive layer 12.

As an example, in order to allow the inorganic electrochromic film and an organic electrochromic solution to undergo a polymerization reaction to produce the organic-inorganic electrochromic thin film 14, the inorganic electrochromic film is immersed in a silane coupling agent solution for at least 10 minutes and then dried; at the room temperature, the inorganic electrochromic film is dipped into a pyrrole-solution for 5 minutes and then drawn out, the pyrrole solution is obtained by mixing pyrrole and anhydrous ethanol, and the percentage by mass of pyrrole is 40%; the inorganic electrochromic film is dipped into a ferric trichloride solution to undergo a polymerization reaction for 20 minutes and then drawn out, and thereafter cleaned with deionized water and anhydrous ethanol, to produce the organic-inorganic electrochromic thin film, and the ferric trichloride solution is obtained by mixing ferric trichloride and deionized water, adding a proper dopant, and then adding concentrated hydrochloric acid for hydrolyzation, and the percentage by mass of ferric trichloride is 30%.

S207, an electrolyte layer is formed on the organic-inorganic electrochromic thin film.

The electrolyte layer may be formed of appropriate electrically-conductive materials, such as electrolyte materials in form of a solution or a solid including lithium perchlorate, sodium perchlorate, or the like. Thus, when the electrochromic device works, a proper voltage is applied between the first transparent electrically-conductive layer and the second transparent electrically-conductive layer; under the action of the voltage, the organic-inorganic electrochromic thin film will undergo an oxidation-reduction reaction; correspondingly, the electrolyte layer provides compensation ions such as hydrogen-ions, lithium-ions, potassium-ions, sodium-ions, and so on as required for the oxidation-reduction reaction that the organic-inorganic electrochromic thin film undergoes.

S208, an ion-storage layer is formed on the electrolyte layer.

When the electrochromic device works, a proper voltage is applied between the first transparent electrically-conductive layer and the second transparent electrically-conductive layer; under the action of the voltage, the organic-inorganic electrochromic thin film will undergo an oxidation-reduction reaction, and its color will also change; correspondingly, the ion-storage layer stores the corresponding compensation ions when the organic-inorganic electrochromic thin film undergoes the oxidation-reduction reaction, and thus plays a role of maintaining charge balance for the whole system.

After the electrolyte layer is formed on the organic-inorganic electrochromic thin film and the ion-storage layer is formed on the electrolyte layer, at this point, an electrochromic device 1 as illustrated in FIG. 1 is formed.

As an example, the following table 2 records the experimentally-measured values of transmittance in various display regions (including upper, lower, left, right and center regions) of a conventional electrochromic device and of the electrochromic device provided by the embodiment of the present disclosure during color-displaying, as well as the 3sigma values calculated from the transmittances.

TABLE 2

| Region of Electrochromic Device | Upper | Lower | Left | Right | Center | 3sigma |
|---|---|---|---|---|---|---|
| Transmittance of Conventional Electrochromic Device | 45% | 60% | 52% | 30% | 60% | 37.6% |
| Transmittance of the electrochromic device of the embodiment | 60% | 63% | 62% | 60% | 63% | 4.5% |

As can be seen from the data of Table 2, compared with a conventional electrochromic device, the electrochromic device 1 formed by the method of manufacturing an electrochromic device provided by the embodiment of the present disclosure has very slight difference in transmittance among various regions thereof during color-displaying, and thus its 3sigma value calculated from the transmittances in the various regions during the color-displaying is also very small. 3sigma, which is 3 times the standard deviation, usually represents the standard deviation of the data of a process; standard deviation, which refers to the square root of the average of the sum of the squared difference from true values, is used as a numerical criterion to estimate measurement accuracy under certain conditions.

The method of manufacturing an electrochromic device, provided by this embodiment of the present disclosure, comprises: providing a first substrate; forming a first transparent electrically-conductive layer on the first substrate; providing a second substrate opposite to the first substrate; forming a second transparent electrically-conductive layer on the inner side of the second substrate; and forming an organic-inorganic electrochromic thin film by a way as follows: forming a mesh-like microsphere-film on the first transparent electrically-conductive layer; after an inorganic electrochromic film is formed in the voids of the microsphere-film, removing the microsphere-film; then making the inorganic electrochromic film and an organic electrochromic solution undergo a polymerization reaction. In this way, since the organic-inorganic electrochromic thin film in the electrochromic device is formed by a way as follows: forming a mesh-like microsphere-film on the first transparent electrically-conductive layer, and after an inorganic electrochromic film is formed in the voids of the microsphere-film, removing the microsphere-film, and then making the inorganic electrochromic film and an organic electrochromic solution undergo a polymerization reaction, this makes the organic and inorganic chromic materials that are employed mixed uniformly, and as result, even if the such-formed electrochromic device is increased in size (for example, a floor-to-ceiling window, a car-window, or other large-sized applications), it still has slight difference in transmittance among various regions thereof, and also its display effect is good as well.

The above are merely exemplary implementations of the present disclosure, but not for limiting the scope of the disclosure; instead, the scope of the disclosure should be defined by the appended claims.

What is claimed is:

1. An electrochromic device, comprising:
providing a first substrate and a second substrate opposite to each other,
providing a first transparent electrically-conductive layer on the inner side of the first substrate,
providing a second transparent electrically-conductive layer on the inner side of the second substrate, and
providing an organic-inorganic electrochromic thin film between the first transparent electrically-conductive layer and the second transparent electrically-conductive layer,
wherein the organic-inorganic electrochromic thin film is obtained by:
forming a mesh-like microsphere-film on the first transparent electrically-conductive layer;
forming an inorganic electrochromic film in voids of the microsphere-film and then removing the microsphere-film; and
making the inorganic electrochromic film and an organic electrochromic solution undergo a polymerization reaction.

2. The electrochromic device according to claim 1, further comprising:

providing an electrolyte layer between the organic-inorganic electrochromic thin film and the second transparent electrically-conductive layer.

3. The electrochromic device according to claim 2, further comprising:
providing an ion-storage layer between the electrolyte layer and the second transparent electrically-conductive layer.

4. A method of manufacturing an electrochromic thin film, comprising:
forming a mesh-like microsphere-film on a substrate;
forming an inorganic electrochromic film in voids of the microsphere-film;
removing the microsphere-film with a solvent; and
making the inorganic electrochromic film and an organic electrochromic solution undergo a polymerization reaction to produce an organic-inorganic electrochromic thin film on the substrate.

5. The method of manufacturing an electrochromic thin film according to claim 4, wherein a material of the microspheres in the microsphere-film is polymethylmethacrylate.

6. The method of manufacturing an electrochromic thin film according to claim 4, wherein removing of the microsphere-film with a solvent comprising:
dissolving the microsphere-film with an acetone solvent or a carbon tetrachloride solvent.

7. The method of manufacturing an electrochromic thin film according to claim 4, wherein making the inorganic electrochromic film and an organic electrochromic solution undergo a polymerization reaction to produce an organic-inorganic electrochromic thin film comprises:
immersing the inorganic electrochromic film in a silane coupling agent solution and then drying;
at a room temperature, dipping the inorganic electrochromic film into a pyrrole-solution and then drawing it out, wherein the pyrrole solution is obtained by mixing pyrrole and anhydrous ethanol, and the percentage by mass of pyrrole is 40%; and
dipping the inorganic electrochromic film into a ferric trichloride solution to undergo a polymerization reaction and then drawing it out, and thereafter cleaning to obtain the organic-inorganic electrochromic thin film.

8. A method of manufacturing an electrochromic device, comprising:
providing a first substrate,
providing a first transparent electrically-conductive layer on the first substrate,
providing a second substrate opposite to the first substrate,
providing a second transparent electrically-conductive layer on the inner side of the second substrate, and
between the first transparent electrically-conductive layer and the second transparent electrically-conductive layer, forming an organic-inorganic electrochromic thin film by using the method of manufacturing an electrochromic thin film according to claim 4.

9. The method of manufacturing an electrochromic device according to claim 8, further comprising:
on the organic-inorganic electrochromic thin film, forming an electrolyte layer.

10. The method of manufacturing an electrochromic device according to claim 9, further comprising:
on the electrolyte layer, providing an ion-storage layer.

11. The method of manufacturing an electrochromic thin film according to claim 4, further comprising providing a microsphere-emulsion for forming the microsphere-film, which comprises:

adding a stabilizer in a mixed solvent of anhydrous ethanol and deionized water and stirring until the stabilizer is fully dissolved;

adding an initiator and methylmethacrylate in the mixed solvent;

under the protection of a protective gas, making the mixed solvent react to obtain the microsphere-emulsion.

12. The method of manufacturing an electrochromic thin film according to claim 11, wherein forming of the mesh-like microsphere-film on the substrate comprises:

coating the microsphere-emulsion on the substrate, and drying the microsphere-emulsion to form the mesh-like microsphere-film on the substrate.

13. The method of manufacturing an electrochromic thin film according to claim 11, wherein a material of the inorganic electrochromic film is tungsten trioxide.

14. The method of manufacturing an electrochromic thin film according to claim 13, further comprising providing tungsten trioxide sol for forming the inorganic electrochromic film, which comprises:

adding tungstate into deionized water to produce a tungstate solution;

in the tungstate solution, dropwise adding concentrated hydrochloric acid until no white floc is remained;

in the tungstate solution, dropwise adding concentrated sulfuric acid to adjust a pH value of the tungstate solution to be within a range of 1-3;

in the tungstate solution, sequentially dropwise adding anhydrous ethanol, acetone, acetylacetone; and stirring the tungstate solution to form the tungsten trioxide sol.

15. The method of manufacturing an electrochromic thin film according to claim 14, wherein forming of the inorganic electrochromic film in the voids of the microsphere-film comprises:

in vacuum, dipping the microsphere-film into the tungsten trioxide sol, and after a heat treatment, forming an inorganic electrochromic film in the voids of the microsphere-film.

* * * * *